United States Patent [19]

Zhang

[11] Patent Number: 5,995,189
[45] Date of Patent: Nov. 30, 1999

[54] LIQUID-CRYSTAL DISPLAY DEVICE

[75] Inventor: Hongyong Zhang, Kanagawa, Japan

[73] Assignee: Semiconductor Energy Laboratory Co., Ltd., Kanagawa-ken, Japan

[21] Appl. No.: 08/768,066

[22] Filed: Dec. 16, 1996

[30] Foreign Application Priority Data

Dec. 21, 1995 [JP] Japan .................................. 7-350229

[51] Int. Cl.$^6$ ....................... G02F 1/1339; G02F 1/1345; G02F 1/1333
[52] U.S. Cl. ........................ 349/153; 349/151; 349/122; 345/206
[58] Field of Search .................................. 349/153, 151, 349/122, 152; 345/206

[56] References Cited

U.S. PATENT DOCUMENTS

| | | | |
|---|---|---|---|
| 5,148,301 | 9/1992 | Sawatsubashi et al. ................. | 349/153 |
| 5,179,460 | 1/1993 | Hinata et al. ............................. | 349/149 |
| 5,396,356 | 3/1995 | Fukuchi .................................... | 349/153 |
| 5,621,553 | 4/1997 | Nishiguchi et al. ..................... | 349/153 |
| 5,684,555 | 11/1997 | Shiba et al. .............................. | 349/149 |
| 5,745,208 | 4/1998 | Grupp et al. ............................. | 349/153 |

*Primary Examiner*—Tiep H. Nguyen
*Attorney, Agent, or Firm*—Fish & Richardson

[57] ABSTRACT

The present invention related to unifying steps of sealing material so that the yield and the reliability of a liquid-crystal display device become high. A starting film of scanning lines is patterned so that prismatic dummy wirings 301 for the first layer which are not electrically connected are formed in regions R1 and R2, and wirings 302 extending from the pixel section are formed in a region R3, and wirings 303 having connection end portions 303a are formed in a region R4. After an interlayer insulation film is formed on those surface, the starting film of the signal lines is patterned so that the dummy wirings 304 for the second layer are formed to embed the gaps between the wirings 301 to 303, and also the wirings 305 and the wirings 303 which extend from the pixel portion are connected to each other. As a result, the cross-sectional structure along the line A-A' of the sealing material formation region 107 can be unified.

23 Claims, 12 Drawing Sheets

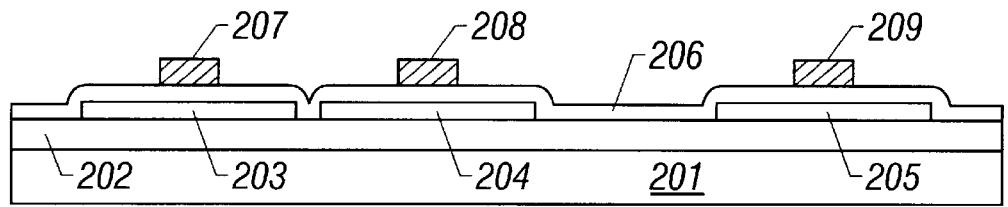
FIG. 2A DRIVER CIRCUIT TFT → ← PIXEL TFT
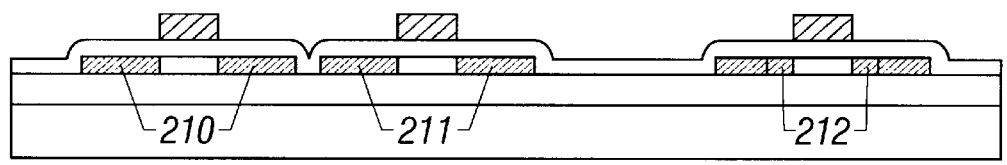
FIG. 2B
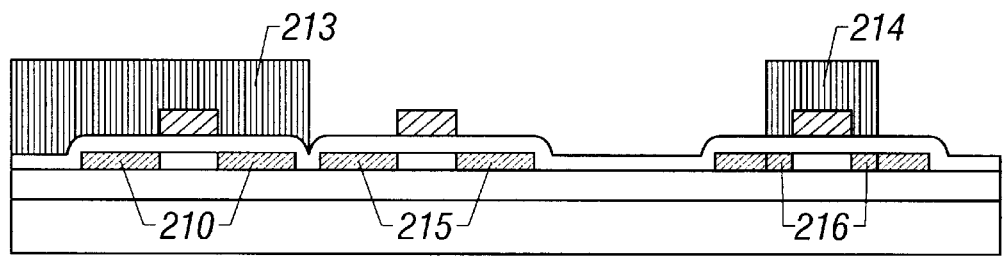
FIG. 2C
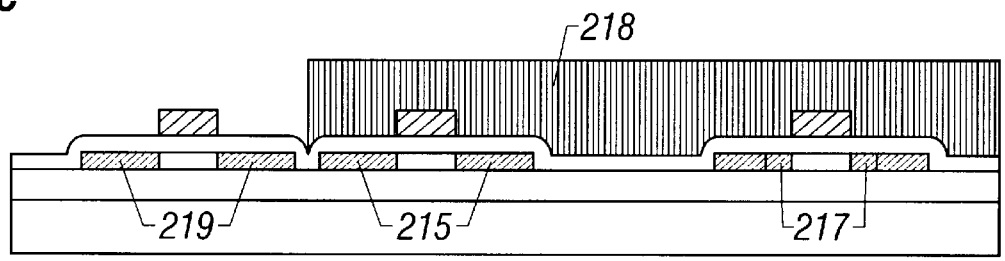
FIG. 2D
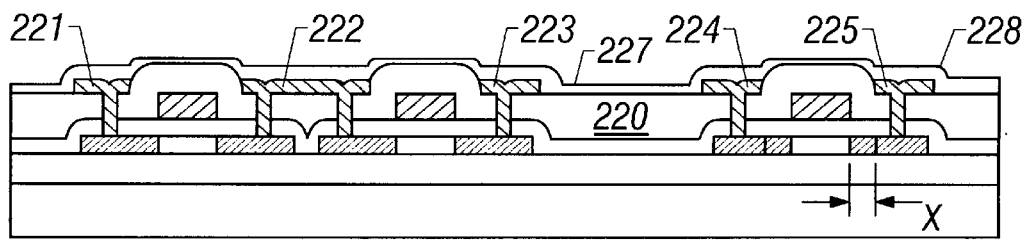
FIG. 2E DRIVER CIRCUIT TFT → ← PIXEL TFT

SIGNAL LINE
DRIVE CIRCUIT SIDE
REGION R2

SIGNAL LINE DRIVE CIRCUIT SIDE
REGION R1

SIGNAL LINE EXTENSION SIDE
REGION R3

SIGNAL LINE EXTENSION SIDE
REGION R4

SIGNAL LINE DRIVE CIRCUIT SIDE
REGION R2

SIGNAL LINE DRIVE CIRCUIT SIDE
REGION R1

SIGNAL LINE EXTENSION SIDE
REGION R3

SIGNAL LINE EXTENSION SIDE
REGION R4

PIXEL PORTION

PIXEL PORTION

LIQUID-CRYSTAL DISPLAY DEVICE

BACKGROUND OF THE INVENTION

1. Field of the Invention

The present invention relates to a liquid-crystal display device of the active matrix system for reducing failure occurring when bonding substrates, and more particularly to a peripheral circuit integral type liquid-crystal display device.

2. Description of the Related Art

A conventional active matrix liquid-crystal display device is so designed as to control the optical characteristics such as a light transmission property of a liquid-crystal material which is held between a pair of pixel electrodes using the switching operation of a two-terminal element such as an MIM which is disposed in a pixel section in the form of a matrix or a three-terminal element such as a TFT, for display. In general, TFTs using amorphous silicon have been widely used for the switching element of the pixel electrodes.

However, because the mobility of the electric field effect of amorphous silicon is low to the degree of 0.1 to 1 cm/Vs, the TFT using amorphous silicon cannot be disposed in a peripheral drive circuit that controls the TFT connected to the pixel electrode.

For that reason, in the conventional active matrix liquid-crystal device, the peripheral drive circuit which is made up of a semiconductor integrated circuit is attached externally to a liquid-crystal panel through the tape automatic bonding (TAB) technique or the chip on glass (COG) technique.

FIG. 16 is a front view showing the outline of an active matrix liquid-crystal panel in accordance with a first conventional example, to which a peripheral drive circuit is attached externally. As shown in FIG. 16, scanning lines 2 and signal lines 3 are disposed on an element substrate 1 made of, for example, glass or quartz in a matrix, and in a pixel section 4, pixel electrodes and a switching pixel TFT for the pixel electrodes are connected to each of the cross portions of those wirings. The scanning lines 2 and the signal lines 3 extend up to the outside of a sealing material region 5, respectively, and for that reason, the number of wirings which are transverse to the sealing material is as much as the number of the scanning lines 2 and the signal lines 3 at the minimum. The ends of those wirings form extension terminals 6 as they are, and the extension terminals 6 are connected with a peripheral drive circuit not shown. Furthermore, the element substrate 1 is joined to an opposite substrate not shown through the sealing material disposed in the sealing material region 5, and a liquid-crystal material is interposed between those substrates through the sealing material.

Also, in recent years, in order to obtain a TFT with a large mobility of the electric field effect, a technique for fabricating the TFT using crystalline silicon has been intensively researched. The TFT using the crystalline silicon enables operation which is remarkably higher than that of an amorphous silicon TFT, and not only a TFT of NMOS but also a TFT of PMOS are obtained from crystalline silicon in the same manner, thereby being capable of obtaining a CMOS circuit. Hence, a display section as well as the peripheral drive circuit can be fabricated on the same substrate.

FIG. 17 is a front view showing the outline of an active matrix liquid-crystal display device in accordance with a second conventional example, in which a peripheral drive circuit and a display section are integrated on a panel. As shown in FIG. 17, a pixel section 12 is disposed on an element substrate 11 made of, for example, glass or quartz, and a signal line drive circuit 13 is disposed on an upper side of the pixel section 12 around the pixel section 12, and a scanning line drive circuit 14 is disposed on a left side thereof. Signal lines 15 and scanning lines 16 are connected to the signal line drive circuit 13 and the scanning line drive circuit 14, respectively. The signal lines 15 and the scanning lines 16 form a lattice in the pixel section 12, and the ends of the signal lines 15 and the scanning lines 16 extend up to the outside of the sealing material region 17 and are connected with a control circuit, a power supply not shown, or the like. Also, the element substrate 11 and the opposite substrate 18 are joined to each other through the sealing material formed in the sealing material region 17, and a liquid-crystal material is interposed between those substrates 11 and 14 by the shape of the sealing material. Further, an external terminal 19 is disposed on the element substrate 11.

In the first conventional example shown in FIG. 16, the wiring structure around the pixel section 4 is symmetrical with respect to top and down as well as right and left on the paper surface with the result that the steps of the sealing section are made uniform, thereby being capable of making an interval between the substrates uniform.

However, in the first conventional example, because the peripheral drive circuit is connected to the outside of the sealing material, there are a lot of wirings that are transverse to the sealing material, and moisture enters from the interfaces between the wirings which connect the drive circuit to the pixel section and the sealing material, resulting in such a problem that the liquid-crystal surface material is deteriorated. Also, because the peripheral drive circuit is disposed outside, the device is made large in size.

In order to eliminate those problems, the peripheral drive circuit integral type active matrix liquid-crystal display device in accordance with the second conventional example shown in FIG. 17 has a peripheral drive circuit disposed inside the sealing material region 17. Also, a one-side drive system is generally adopted without any provision of a redundant circuit. For that reason, as shown in FIG. 17, since wirings are transversal to the sealing material only on the right side and the lower side of the element substrate 11, the wiring structure has no symmetry with respect to top and down as well as right and left on the paper surface, the step of the sealing material on the peripheral drive circuit side is different from that of the sealing material on a wiring extending side. Hence, in bonding the substrates together, because no pressure is uniformly applied to the substrate. It is difficult to make an interval between the substrates uniform. As a result, nonuniformity occurs on display, or an image quality is deteriorated.

In particular, because the step of the sealing material on the peripheral drive circuit side is low, when bonding the substrates together, there may be a case in which the wirings are short-circuited between the top and the bottom in the peripheral drive circuit, thereby being liable to generate a line defect. Those problems lead to additional causes such as the deterioration of the yield of the peripheral drive circuit integral type liquid-crystal display device, or the lowering of the reliability.

Also, in the pixel element, a most projected portion is in a region where the scanning lines and the signal lines are superimposed one on another, and in the region, not only the scanning line, the signal line, an inter-layer insulation film for separating those lines from each other, but also a pixel electrode, a black matrix and so on are laminated one on another. In general, columnar fibers for maintaining the interval between the substrates are mixed with the sealing material. The dimensions of the fiber are set to values obtained by taking into consideration the margin in addition to the thickness of the projected portion in the pixel section and the dimensions of spacers dispersed inside the sealing material in such a manner that the step of the sealing material is higher in level than the pixel section. However, if the spacer is disposed on the projected portion of the pixel section, the pixel portion becomes higher than the sealing material, and when the substrates are bonded together under this state, the scanning lines and the signal lines are short-circuited between the top and the bottom through the spacers, thereby causing the point defect and the line defect.

SUMMARY OF THE INVENTION

The present invention has been made to eliminate the above problems with the conventional devices, and therefore an object of the present invention is to provide a peripheral drive circuit integral type liquid-crystal display device which is excellent in image quality and high in reliability.

In order to solve the above problems, according to the present invention, there is provided a liquid-crystal display device, comprising: an element substrate having a matrix circuit; an opposite substrate which is opposite to said element substrate; a sealing member for bonding said element substrate and said opposite substrate together; and substrate interval correction means having a laminate structure consisting of at least one layer and disposed in a region where said sealing material is formed.

Also, according to the present invention, there is provided a liquid-crystal display device, comprising: an element substrate matrix circuits having signal lines and scanning lines which are disposed in a matrix and separated from each other through a first interlayer insulation film, and pixel electrodes disposed on cross points of said signal lines and said scanning lines and separated from the signal lines through a second interlayer insulation film, and a peripheral drive circuit for controlling said matrix circuit; an opposite substrate which is opposite to said element substrate; a sealing material which surrounds said matrix circuit and bonds said element substrate and said opposite substrate together; and substrate interval correction means having at least first support means made of the same material as the signal lines, said first interlayer insulating film, second support means made of the same material as the signal lines, and a second interlayer insulation film formed in different layers from each other, in the formation region of said sealing material in said element substrate.

Further, according to the present invention, there is provided a liquid-crystal display device, comprising: an element substrate matrix circuits having signal lines and scanning lines which are disposed in a matrix and separated from each other through a first interlayer insulation film, pixel electrodes disposed on cross points of said signal lines and said scanning lines and separated from the signal lines through a second interlayer insulation film, and a thin-film transistor for operating the pixel electrode, and a peripheral drive circuit for controlling said matrix circuit; an opposite substrate which is opposite to said element substrate; a sealing material which surrounds said matrix circuit and bonds said element substrate and said opposite substrate together; and substrate interval correction means having at least support means made of the same material as the scanning lines, said first interlayer insulating film, and a second interlayer insulation film formed in different layers from each other, in the formation region of said sealing material in said element substrate.

The above and other objects and features of the present invention will be more apparent from the following description taken in conjunction with the accompanying drawings.

FIG. 1 is a front view showing the outline of an element substrate of an active matrix type liquid-crystal display device in accordance with embodiments of the present invention, in which peripheral drive circuits 103, 102 and a display section 102 are disposed on an element substrate 101.

As shown in FIG. 1, signal lines 105 and scanning lines 106 are transversal to a sealing material formation region 107 on the right and bottom sides of a paper surface, but those lines 105 and 106 are not transversal to the sealing material formation region 107 on the side of peripheral circuits 103 and 104. For that reason, in the present invention, there is formed substrate interval correction means that makes the step of the sealing material uniform.

FIG. 6 is a cross-sectional view showing substrate interval maintaining means taken along a width direction of the sealing material. As shown in FIG. 6, in the sealing material formation region, first support members 301, 302 and 303 made of the same material as that of the scanning lines 106, a first interlayer insulation layer 220 that separates the signal lines 105 from the scanning lines 106, and second support members 304 made of the same material as that of the signal lines 105 are laminated one on another. In particular, because it is designed that the second support members 304 do not exist on the first support members 301, 302 and 303, the cross-sectional structure of the substrate interval maintaining means along the edge portion of the sealing material formation region 107 is made uniform, thereby being capable of making the step of the sealing material uniform.

FIG. 15 is a cross-sectional view showing another substrate interval maintaining means taken along the width direction of the sealing material. As shown in FIG. 15, in the sealing material formation region 107, first support members 301, 302 and 303 made of the same material as that of the scanning lines 106, a first interlayer insulation layer 220 that separates the signal lines 105 from the scanning lines 106, and second support members 701 made of the same material as that of the signal lines 105 are laminated one on another. A region where the thickness of the matrix circuit is maximum is a region in which the signal lines 105 and the scanning lines 106 are superimposed one on the other. In the region, the signal lines, the interlayer insulation layer, the scanning lines and a passivation film are laminated one on another at least on the element substrate. Hence, in the present invention, the first support members 301, 302 and 303 and the second support members 701 are designed so as to be superimposed one on the other, thereby being capable of making the step of the substrate interval maintaining means nearly equal to the height of the region in which the thickness of the matrix circuit is maximum. Also, the step of the matrix circuit containing a spacer is made lower than the sealing material, thereby being capable of supporting a pressure required when bonding the substrates together by the sealing material. As a result, the spacer can prevent the scanning lines and the signal lines from being short-circuited between the upper and lower sides. It should be noted that because in the region where the signal lines 105 and the scanning lines 106 are superimposed one on the other, pixel electrodes, a black matrix and so on are further laminated one on another, the substrate interval formation means may be also designed so that the pixel electrodes, the black matrix and so on are laminated one on another in the formation means.

FIG. 4 is a top view showing the substrate interval correction means, in which linear first support members 301, 302 and 303 and second support members 304 are disposed alternately at regular intervals in the sealing material formation region 107.

The scanning lines extending from the matrix circuit are formed integrally with the first support members 302 in a region R3 transversal to the sealing material formation region 107 and extend to the outside of the sealing material formation region 107. On the other hand, the signal lines 305 that extend from the matrix circuit 102 are connected to the first support members 303 that are transversal to the sealing material formation region 107 inside the sealing material formation region 107.

As described above, according to the present invention, a wiring pattern which is transversal to the sealing material formation region 107 and electrically connected to an external circuit of the element substrate is made up of only the first support members 302 and 303, thereby making the step of the sealing material more uniform.

Also, as shown in FIG. 8, a wiring from the matrix circuit 102 or the peripheral circuits 103 and 104 is not transversal to the sealing material formation region 107 in the regions R1 and R2. The wiring is formed in the shape of a rectangular wave which is nearly equal to the width of the sealing material formation region 107 without disconnecting a first wiring layer 401. As a result, because the first wiring layer exists in an arbitrary cross-sectional structure in the width direction of the sealing material formation region 107, moisture can be prevented from entering from the exterior.

Also, in the present invention, the substrate interval maintaining means is so designed as to be formed together with a thin-film transistor that drives said pixel electrode, the first wiring layer is formed together with the signal lines, and the second wiring layer is formed together with the signal line.

BRIEF DESCRIPTION OF THE DRAWINGS

FIGS. 2A to 2E are diagrams showing a process of fabricating a TFT in accordance with embodiments 1 to 5;

DETAILED DESCRIPTION OF THE PREFERRED EMBODIMENTS

Now, a description will be given in more detail of embodiments of the present invention with reference to the accompanying drawings.

Figure 1:
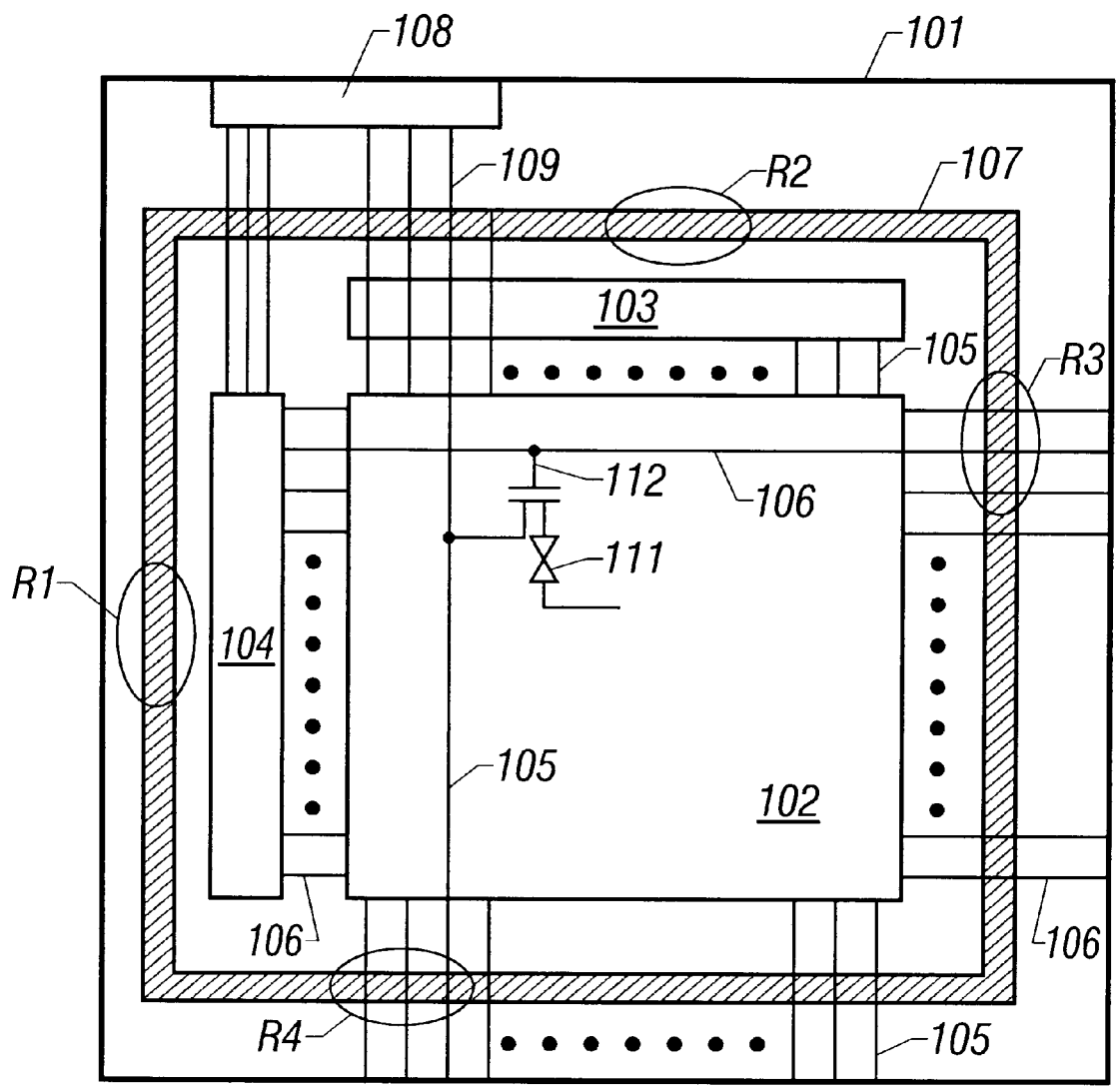
FIG. 1 is a top view showing a liquid-crystal display device in accordance with embodiments 1 to 5 of the present invention.

FIG. 1 is a front view showing an outline of an element substrate of an active matrix type liquid-crystal display device in accordance with embodiments 1 to 5 of the present invention, in which a peripheral drive circuit is integral with a display section. As shown in FIG. 1, a pixel section 102 is disposed on an element substrate 101 made of glass, quartz or the like, and a signal line drive circuit 103 is disposed on the top side in the periphery of the pixel section 102 whereas a scanning line drive circuit 104 is disposed on the left side. The signal line drive circuit 103 and the scanning line drive circuit 104 are connected to the pixel section 102 through the signal lines 105 and the scanning lines 106, respectively. The signal lines 105 and the scanning lines 106 form a lattice in the pixel section 102, and in the intersections thereof, liquid-crystal cells 111 and pixel TFTs 112 are connected in series, respectively. In the pixel TFTs 112, a gate electrode is connected to the signal lines 105, a source electrode is connected to the scanning lines 106, and a drain electrode is connected to an electrode of the liquid-crystal cell 111.

Furthermore, a sealing material region 107 is so arranged as to surround the pixel section 102, the signal line drive circuit 103, and the scanning line drive circuit 104. The element substrate 101 is bonded to an opposite substrate not shown through the sealing material formed in the sealing material region 107, and a liquid-crystal material is sealingly held between those substrates.

On the right and bottom sides of the paper surface, the signal lines 105 and the scanning lines 106 extend to the exterior of the sealing material formation region 107 so as to be connected to a control circuit outside of the panel, or the like. Furthermore, an external terminal 108 is disposed on the element substrate 101, and the external terminal 108 is connected with the signal line drive circuit 103 and the scanning line drive circuit 104 through wirings 109, respectively.

EMBODIMENT 1

The active matrix liquid-crystal display device shown in FIG. 1 according to embodiment 1 is characterized in that, in order to make the step of the sealing material uniform, a wiring pattern (dummy wiring structure) which is shaped and substantially electrically insulated from a starting film of signal lines 103 and scanning lines 104 is disposed in a sealing material formation region 107 to make the structure of the lower portion of the sealing material uniform so that the step of the sealing material is unified. Also, in this embodiment, the above wiring pattern is fabricated together with TFTs disposed on the liquid-crystal panel.

A process of fabricating the active matrix liquid-crystal panel in accordance with this embodiment will be described with reference to FIGS. 2 to 6. FIG. 2 shows a cross-sectional view of a process of fabricating a TFT, in which the left side of FIG. 2 shows a process of fabricating a drive circuit TFT disposed in a peripheral drive circuit (a signal line drive circuit 203, a scanning line drive circuit 204), whereas the right side thereof shows a process of fabricating an pixel TFT disposed in a pixel section 202.

Figure 3:
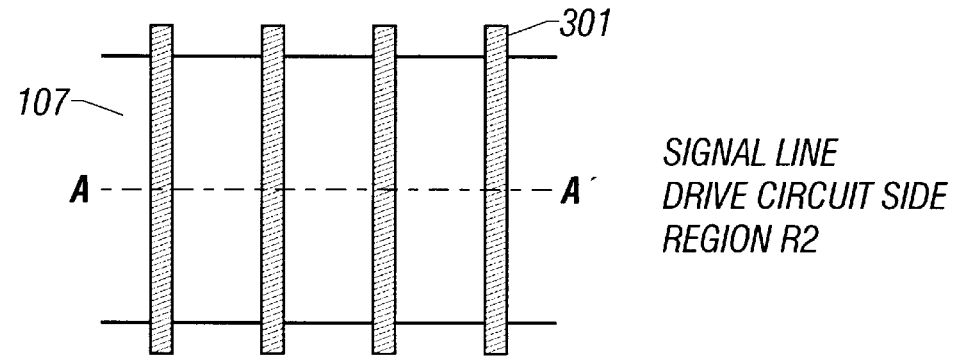
FIG. 3 is a diagram showing a process of fabricating the lower structure of a sealing material in accordance with embodiment 1.
Figure 3:
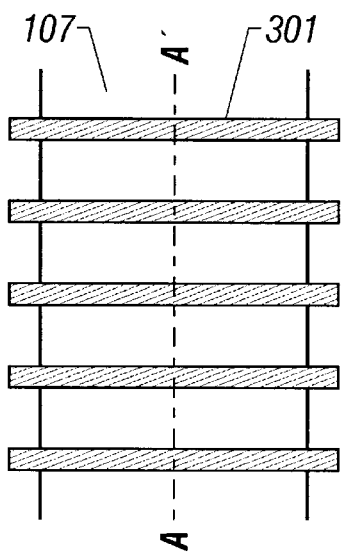
Figure 3:
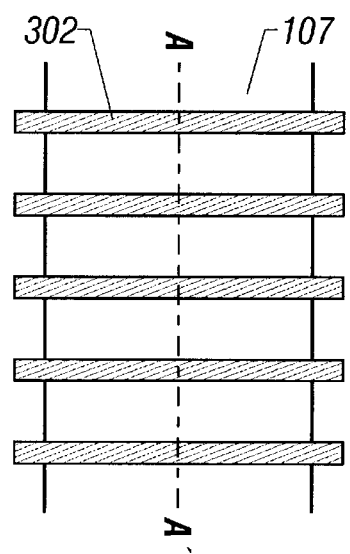
Figure 3:
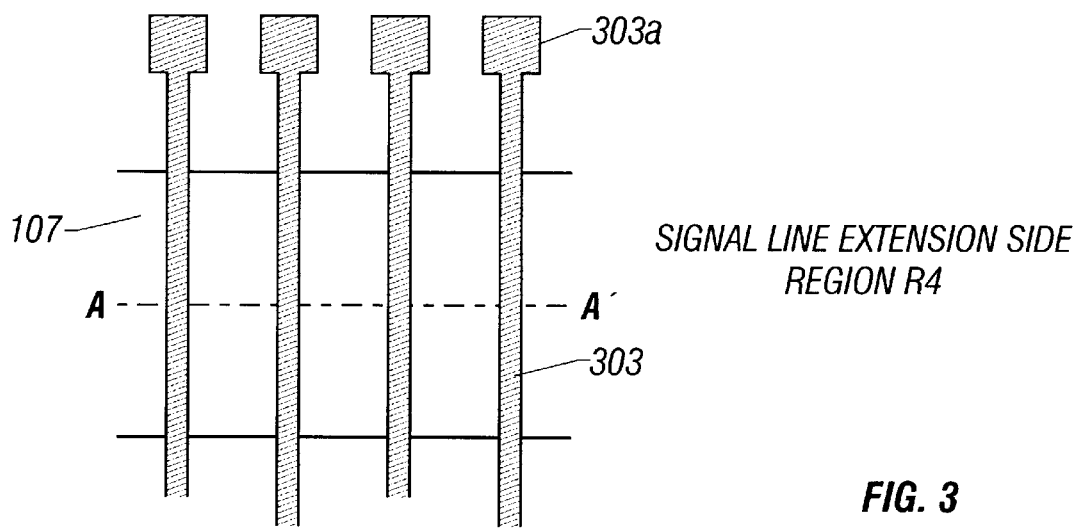
Figure 4:
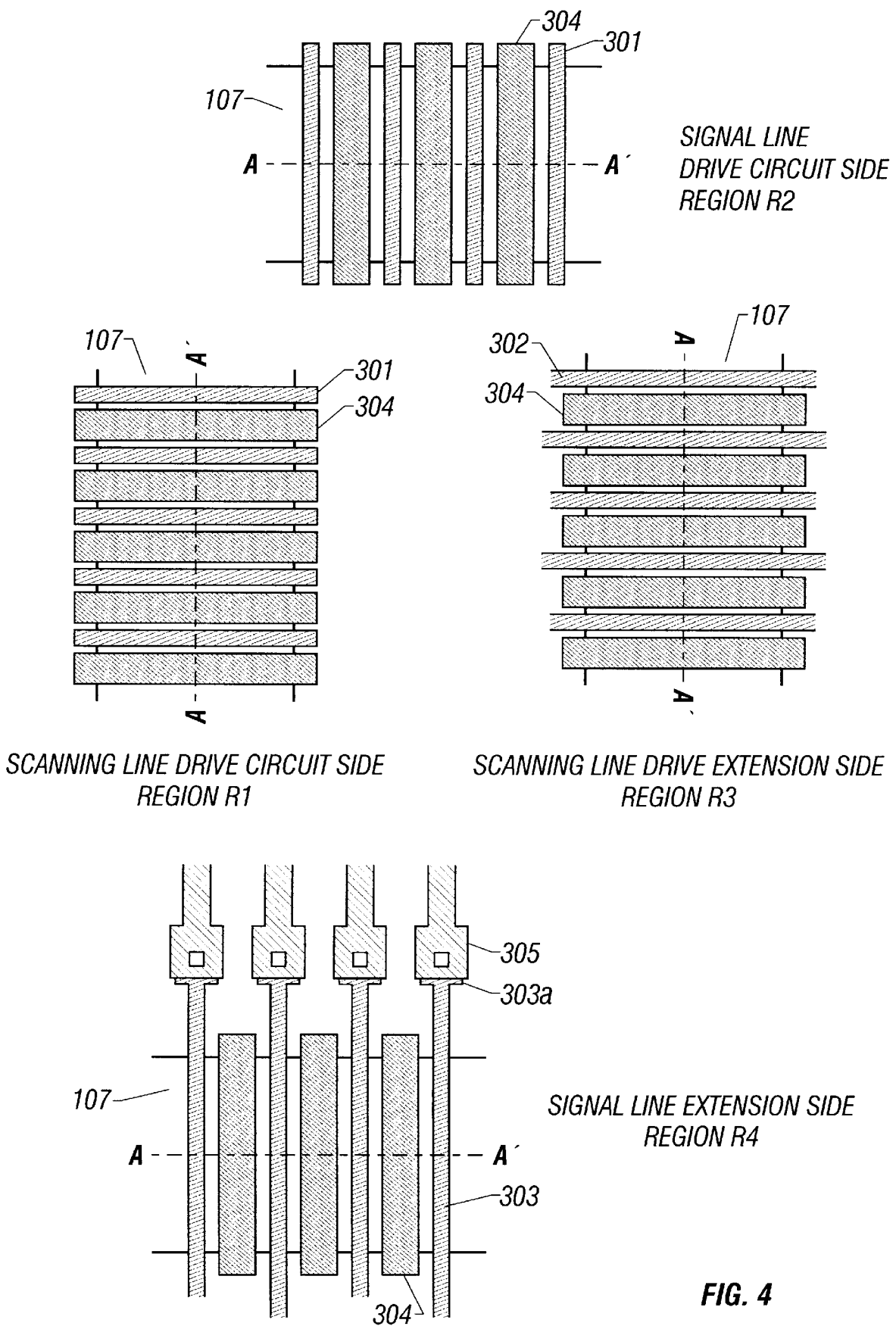
FIG. 4 is a diagram showing a process of fabricating the lower structure of a sealing material in accordance with embodiment 1.
Figure 5:
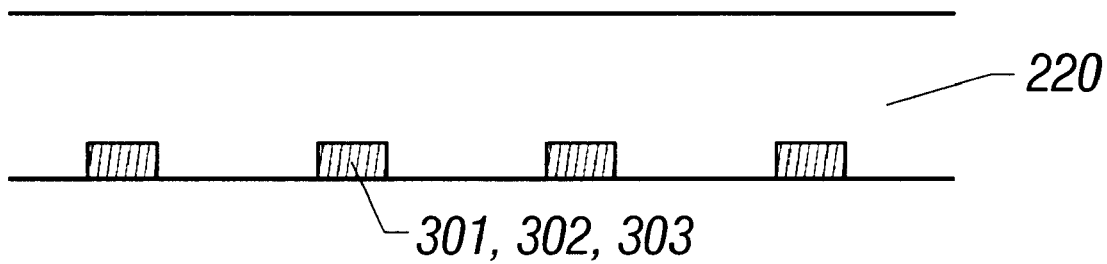
FIG. 5 is a cross-sectional view taken along a line A-A' in FIG. 4 and a cross-sectional view taken along a line B-B' in FIG. 7.
Figure 6:
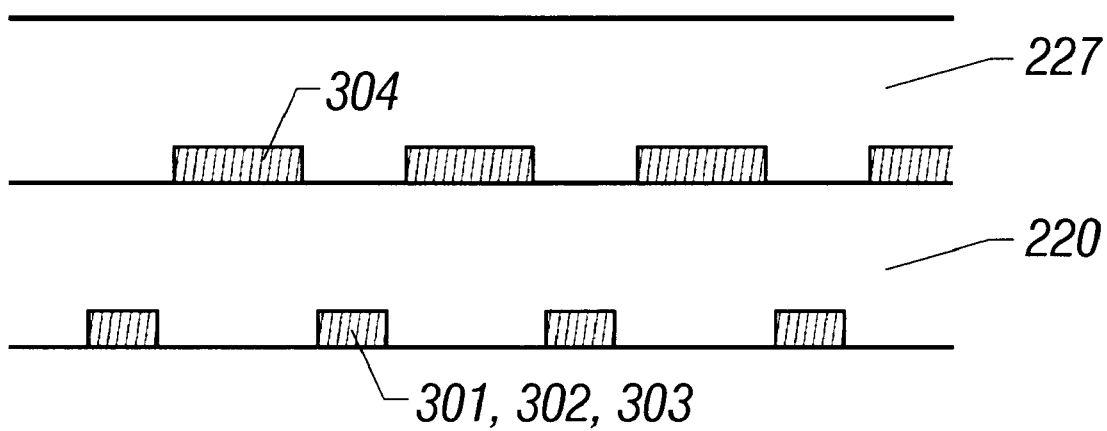
FIG. 6 is a cross-sectional view taken along a line A-A' in FIG. 4 and a cross-sectional view taken along a line B-B' in FIG. 8.

Also, FIGS. 3 to 6 show diagrams showing dummy wirings 301 for a first layer. FIGS. 3 and 4 show schematic top views of the sealing material formation region 107, which are enlarged diagrams of regions R1 to R4 indicated by ellipses in FIG. 1. Also, FIGS. 5 and 6 are cross-sectional views respectively taken along a line A-A' in FIGS. 3 and 4.

In fabrication of the TFT, as shown in FIG. 2A, on a substrate 201 such as a quartz substrate or a glass substrate is formed a silicon oxide film 1000 to 3000 Å in thickness as a base oxide film 202. As a method of forming the silicon oxide film, a sputtering method or a plasma CVD method may be used in an oxide atmosphere.

Subsequently, an amorphous silicon film is formed in thickness of 300 to 1500 Å, preferably 500 to 1000 Å through the plasma CVD method or the LPCVD method. Then, the thermal annealing is conducted on the silicon film at a temperature of 500° C. or higher, preferably, 800 to 950° C., to thereby crystalize the silicon film. After the silicon film has been crystallized through the thermal annealing, the optical annealing may be conducted on the crystallized silicon film to further enhance crystallinity. Also, in crystallization of the silicon film through the thermal annealing, as disclosed in Japanese Patent Unexamined Publication Nos. Hei 6-244103 and Hei 6-244104, an element (catalytic element) such as nickel which promotes the crystallization of silicon may be added.

Then, the silicon film thus crystallized is etched to form active layers 203 (for a p-channel type TFT) and 204 (for an n-channel type TFT) of TFTs in an island-like peripheral drive circuit and an active layer 205 of TFTs (pixel TFTs) in the matrix circuit, respectively. Moreover, an oxide silicon 500 to 2000 Å in thickness is formed as a gate insulation film 206 through the sputtering method in an oxide atmosphere. As a method of forming the silicon oxide film, the plasma CVD method may be used. In the case of forming the silicon oxide film through the plasma CVD method, it is preferable that dinitrogen monoxide ($N_2O$) or oxygen ($O_2$) and monosilane ($SiH_4$) may be used as a raw gas.

Thereafter, a starting film of a wiring for the first layer is formed. In this embodiment, a polycrystalline silicon film (containing a small amount of phosphorus that enhances the electrically conductivity) 2000 Å to 5 μm, preferably 2000 to 6000 Å in thickness is formed on the overall surface of the substrate through the LPCVD method. Then, the polycrystalline silicon film thus formed is etched to form gate electrodes 207, 208 and 209 (FIG. 2A).

Furthermore, in this embodiment, the starting film of the wiring for the first layer is patterned even in the sealing material region 107 to form a wiring pattern as shown in FIG. 3, simultaneously when the gate electrodes 207 to 209 are formed.

Since it is unnecessary to form a wiring pattern which are transversal to the sealing material formation region 107 in the scanning line drive circuit side region R1 and the signal line drive circuit side region R2, linear dummy wirings 301 for the first layer are formed by patterning the silicon film in such a manner that it is disposed at regular intervals so as not to be electrically connected to each other.

In the scanning line extension side region R3, wirings 302 are formed so as to be transversal to the sealing material formation region 107. The wirings 302 correspond to the scanning lines 106 shown in FIG. 1 and are formed by the extensions of the gate electrodes 209 of the pixel TFTs.

In the signal line extension side region R4, wirings 303 are formed so as to be transversal to the sealing material formation region 107. In the end portions of the wirings 303 on the pixel section 102 side are formed connection end portions 303a for connecting with wirings extending from the pixel section 102 for the second layer.

It should be noted that the respective intervals between the dummy wirings 301 and the wirings 302, 303 are set to be identical with the intervals between the scanning lines 106, that is, to be substantially identical with the intervals between the pixels. In this embodiment, the respective intervals between the dummy wiring 301 for the first layer, the wiring 302 and the dummy wiring 301 for the first layer are set to about 50 μm, and their widths are set to about 10 μm.

Therefore, because the dummy wiring 301 for the first layer, the wiring 302 and the wiring 303 are disposed at regular intervals in the sealing material formation region 107 as shown in FIG. 5, the cross-sectional structure of the sealing material formation region 107 can be unified.

It should be noted that the material of the starting films of the gate electrodes 207 to 209, the dummy wirings 301, the wirings 302 and 303 for the first layer is not limited to a silicon film, and the material of the gate electrode which is usually used may be used therefor. For example, silicide, or aluminum, tantalum, chromium, molybdenum or the like which is an anodizable material may be used.

Subsequently, as shown in FIG. 2B, phosphorus is injected into all the island-like active layers 203 to 205 with a doping gas of phosphine ($PH_3$) in the self-alignment manner, using the gate electrodes 207 to 209 as a mask, through the ion doping method. The dose amount is set to $1\times10^{12}$ to $5\times10^{13}$ atoms/cm². As a result, weak n-type regions 210, 211 and 212 are formed.

Then, while a mask 213 made of photoresist which covers the active layer 203 of the p-channel type TFT is being formed, a mask 214 made of photoresist which covers the end of the gate electrode 209 to a portion apart from the end thereof by 3 μm in parallel with the gate electrode 209 in the active layer 205 of the pixel TFTs is formed. Then, phosphorus is again injected into the active layers with a doping gas of phosphine through the ion doping method. The dose amount is set to $1\times10^{14}$ to $5\times10^{15}$ atoms/cm². As a result, strong n-type regions (source/drain) 215 and 216 are formed. In the weak n-type regions 212 in the active layer 205 of the pixel TFTs, since phosphorus is not injected into regions 217 which have been covered with the mask 214 at this doping, it remains weak n-type (FIG. 2C).

Subsequently, the active layers 204 and 205 of the n-channel type TFT shown in FIG. 2D are covered with a mask 218 made of photoresist, and boron is injected into the island-like region 103 with a doping gas of diborane ($B_2H_6$) through the ion doping method. The dose amount is set to $5\times10^{14}$ to $8\times10^{15}$ atoms/cm². In this doping, because the dose amount of boron exceeds the dose amount of phosphorus in FIG. 2C, the weak n-type region (a low-density impurity region) 210 is reverted to a strong p-type region 219.

The strong n-type regions (source/drain) 215, 216, the strong p-type region (source/drain) 219 and the weak n-type region (a low-density impurity region) 217 are formed through the doping process shown in FIGS. 2B to 2D. In this embodiment, the width x of the low-density impurity region 217 is set to about 3 µm.

Thereafter, thermal annealing is conducted on the doped regions at 450 to 850° C. for 0.5 to 3 hours, to thereby recover the regions damaged by doping. As a result, the doping impurities are activated, and the crystallinity of silicon is recovered.

Thereafter, as shown in FIGS. 2E and 5, a silicon oxide film 3000 to 6000 Å in thickness is formed on the entire surface of the substrate as an interlayer insulator 220 through the plasma CVD method. In this embodiment, the thickness of the interlayer insulator 220 is set to 4000 Å. It should be noted that the interlayer insulator 220 may be made up of a single-layer film consisting of a silicon nitride film, or a multi-layer film consisting of a silicon oxide film and a silicon nitride film. The interlayer insulator 220 is etched to form sources/drains 219, 215 and 216 as well as contact holes for connection end portions 303a of the wirings 303 shown in FIG. 3.

Then, the starting film of the wiring and electrodes for the second layer is formed. In this embodiment, a titanium film 1000 Å in thickness, an aluminum film 2000 Å in thickness, and a titanium film 1000 Å in thickness are continuously formed through the sputtering method. The three-layer film is etched so that while electrodes/wirings 221, 522 and 523 of the peripheral circuits and electrode/wiring 224 and 225 of the pixel TFT are formed, dummy wirings 304 for the second layer which are not electrically connected to the sealing material formation region 107 are formed as shown in FIGS. 4 and 6. It should be noted that FIG. 6 is a cross-sectional view taking along a line A-A' in the regions R1 to R4 of FIG. 4.

As shown in FIG. 4, the dummy wirings 304 for the second layer are disposed uniformly at the respective gaps defined between the dummy wirings 301, the wirings 302 and the wirings 303 for the first layer which are formed of the starting film (silicon film) of the electrodes and the wirings for the first layer. For that reason, as shown in FIG. 6, the lower structure of the sealing material formation region 107 can be unified. It should be noted that the dummy wirings 304 are formed so that one wiring is divided in the scanning line drive circuit side region R1 and the scanning line extension line side region R3, and likewise so that one wiring is divided in the signal line drive circuit side region R2 and the signal line extension line side region R4.

Further, in this embodiment, as shown in FIG. 3, for connection with an external circuit of the element substrate 101 or an external terminal, wiring patterns (the wirings 302 and the wirings 303) which are transversal to the sealing material formation region 107 are designed so as to be formed of the starting film of the wiring for the first layer, and the wirings for the second layer are designed so as not to extend to the exterior of the sealing material formation region 107, whereby the step of the lower structure in the sealing material formation region 107 is more unified.

Hence, in order to allow the pixel section 102 to be connected to another circuit at the exterior of the panel in the signal line extension side region R4, in patterning the starting film (titanium/aluminum/titanium film) of the electrode and the wiring for the second layer, there are formed the wirings 305 which are connected to the wirings 303 at the connection end portions 303a thereof. The wirings 303 and the wirings 305 enable the pixel section 102 to be connected to another circuit at the exterior of the panel.

It should be noted that the pitch of the dummy wirings 304 for the second layer is set to the pitch of the scanning lines 106, that is, the former is made identical with the pitch of the wirings 305, and the width of the dummy wirings 304 for the second layer is set to 30 µm. Because the respective intervals between the dummy wirings 301, the wirings 302 and the wirings 303 for the first layer are set to about 50 µm, the intervals between the end surfaces of the dummy wirings 304 for the second layer and the end surfaces of the dummy wiring 301, the wirings 302 and the wirings 303 for the first layer are about 10 µm.

Then, after the starting film (titanium/aluminum/titanium film) of the electrodes/wirings for the second layer has been patterned, a silicon nitride film 1000 to 3000 Å in thickness is formed as a passivation film 226 through the plasma CVD method as shown in FIGS. 2E and 6.

As shown in FIG. 6, in the sealing material formation region 107, the dummy wirings 304 for the second layer are disposed on the interlayer insulation film 220 at regular intervals in a region where the dummy wirings 301, and the wirings 302, 303 for the first layer are not formed, thereby being capable of making identical the cross-sectional structure taken along the line A-A' in FIG. 4, that is, the cross-sectional structure along the outer periphery of the sealing material formation region 107. Then, a passivation film 227 is formed on the surface of the dummy wirings 304 for the second layer, thereby being capable of flattening the surface of the sealing material formation region 107.

It should be noted that in order to make the cross-sectional structure along the outer periphery of the sealing material formation region 107 identical, only the dummy wirings 301, the wirings 302 and the wirings 303 which are formed of the starting film of the electrodes/wirings for the first layer may be disposed. In comparison with the respective intervals between those wirings 301 to 303 being about 50 µm, their widths are small to about 10 µm. As a result, because their strength cannot be compensated, the dummy wirings 304 for the second layer are formed so that the lower structure of the sealing material is reinforced.

Further, in this embodiment, for the purpose of making the step of the lower structure in the sealing material formation region 107 uniform, it is important that the dummy wirings 304 for the second layer are prevented from being superimposed on the dummy wirings 301, the wirings 302 and the wirings 303 for the first layer. If the intervals between the end surfaces are about 10 µm, the dummy wirings 304 for the second layer are prevented from being superimposed on the dummy wirings 301, the wirings 302 and the wirings 303 for the first layer, even though taking into consideration an error in alignment of the mask, or the like.

In this embodiment, the dummy wirings 301 and 304 are formed so as to be longer than the width of the sealing material formation region 107, however, the dummy wirings 301 and 304 may be formed so as not to be projected from the sealing material formation region 107.

It should be noted that the structure of the wiring pattern 109 which is connected with the external terminal 108 may be identical with the structure of the wirings 301 and 305 which are disposed in the signal line extension side region R4. The wiring pattern which is transversal to the sealing material formation region is formed of the starting film of the wirings for the first layer. Then, the wiring pattern which is connected to the wiring pattern for the first layer is formed of the starting film of the wirings for the second layer so as to be connected with the signal line drive circuit 103, the scanning line drive circuit 104 and the external terminal 109.

The passivation film 227 is etched to form contact holes that reach the electrode 225 of the pixel TFT. Finally, an ITO (an indium tin oxide) film 500 to 1500 Å in thickness, which is formed through the sputtering method, is etched to form a pixel electrode 228. In this manner, the peripheral logic circuits and the active matrix circuit are formed integrally (FIG. 2E).

Hereinafter, a process of assembling the active matrix liquid-crystal display panel will be described.

The TFT substrate 101 obtained through the process shown in FIGS. 2 to 6, and a color filter substrate are satisfactorily cleaned of a variety of chemicals such as an etching liquid or a resist separation liquid which have been used for processing the surface, respectively.

Then, oriented films are allowed to stick to the color filter substrate and the TFT substrate. The oriented film has a constant groove cut, and liquid-crystal moleculars are arranged uniformly along the groove. The oriented film material as used is what is obtained by solving polyimide of about 10 wt % in solvent of butyl cellosolve or n-methyl pyrolidone. This is called "polyimide varnish". The polyimide varnish is printed by a flexographic press.

The oriented films which stick to both of the TFT substrate and the color filter substrate are heated and hardened. This is called "bake". The bake is to feed heat air of about 300° C. at the highest use temperature for heating to bake and harden polyimide vanish.

Subsequently, the surface of the glass substrate to which the oriented film sticks is subjected to a rubbing process through which the surface is rubbed with a buff cloth (fabric made of rayon, nylon or the like) 2 to 3 mm in the length of hairs in a given direction to form fine grooves.

Then, spherical spacers of the polymer base, glass base or silica base are dispersed on any one of the TFT substrate and the color filter substrate. As the system of dispersing the spacers, there are the wet system in which spacers are mixed with solvent such as pure water or alcohol and then dispersed on the glass substrate, and the dry system in which spacers are dispersed on the glass substrate without any use of the solvent.

Thereafter, a sealing material is coated on the outer frame of the TFT substrate 101. The coating of the sealing material serves to bond the TFT substrate to the color filter substrate, and to prevent injected liquid-crystal material from flowing externally. The sealing material as used is what is obtained by solving an epoxy resin and a phenol hardener in solvent of ethyl cellosolve. After the coating of the sealing material, two glass substrates are stuck together. The method of sticking those glass substrates together is a heat hardening system of hardening the sealing material for about 3 hours by pressing at a high temperature of 160° C.

A liquid-crystal material is inserted into the active matrix liquid-crystal display device which is obtained by sticking the element substrate and the color filter substrate together from a liquid-crystal injection inlet thereof, and after the injection of the liquid-crystal material, the liquid-crystal injection inlet is sealed with an epoxy resin. In the above manner, the active matrix liquid-crystal display device is assembled.

EMBODIMENT 2

Embodiment 2 is a modified example of embodiment 1, and relates to the dummy wirings for the first layer in region to which the wiring of the sealing material formation region 107 is not transversal in the liquid-crystal panel shown in FIG. 1.

In embodiment 1, because linear dummy wirings 301 for the first layer and the linear dummy wirings 304 for the second layer are alternately arranged, patterning is facilitated. However, because the wiring pattern is so arranged as to be transversal to the sealing material formation region 107, moisture is liable to enter from the interfaces between the wirings, the interlayer insulation film 220 and the passivation film 227. In this embodiment, in the sealing material formation region 107, as in the wirings 302 and 303 shown in FIG. 4, the dummy wirings 301 for the first layer are formed without any disconnection in a region to which the wirings for electrically connecting the pixel section 102, the drive circuits 103 and 104 to the circuit external to the sealing material are not transversal, thereby preventing moisture from entering from the external.

Figure 7:
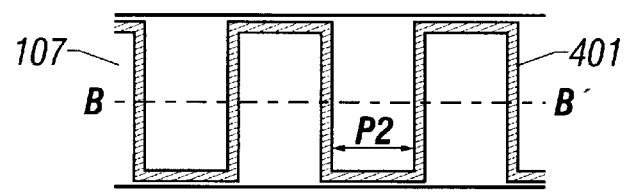
FIG. 7 is a diagram showing a process of fabricating a substrate interval correction means in accordance with embodiment 2.
Figure 7:
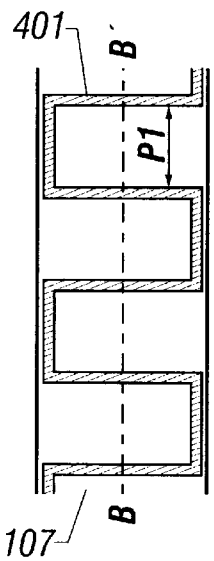
Figure 7:
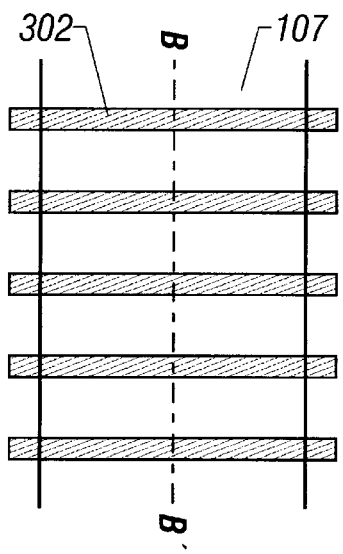
Figure 7:
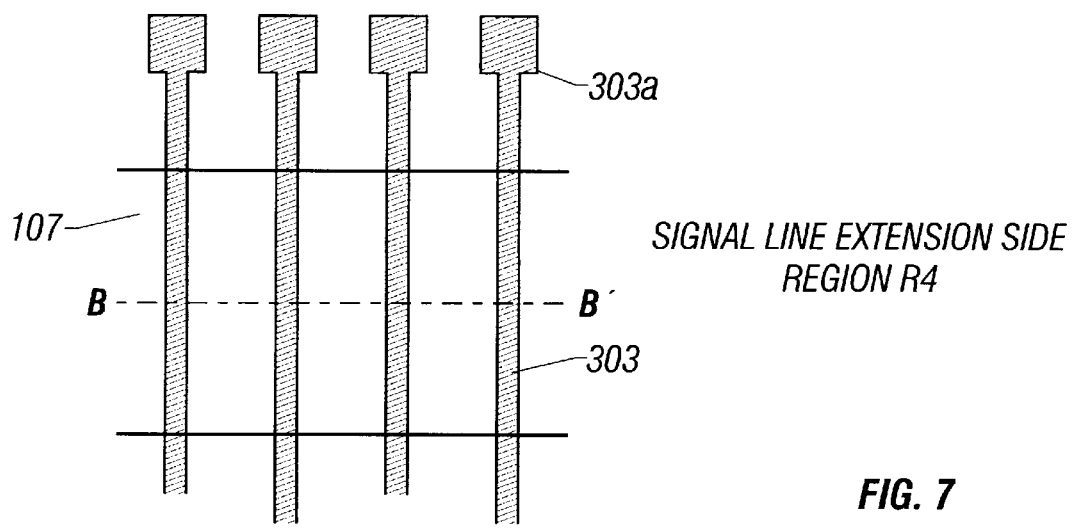
Figure 8:
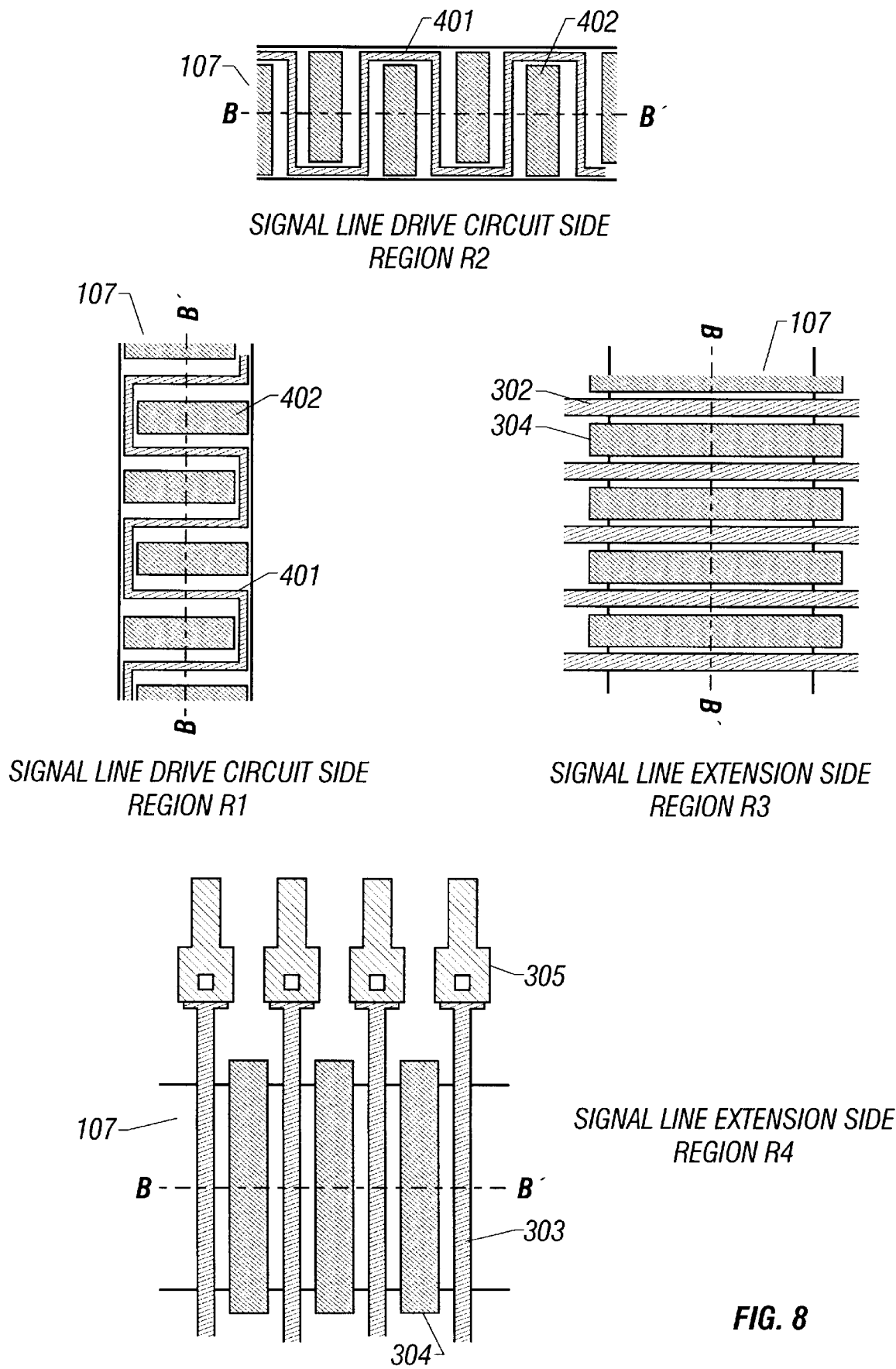
FIG. 8 is a diagram showing a process of fabricating the substrate interval correction means in accordance with embodiment 2.

FIGS. 7 and 8 are diagrams showing a process of fabricating the lower structure of the sealing material in accordance with this embodiment, and FIGS. 7 and 8 are schematic top views of the sealing material formation region 107, and enlarged diagrams of R1 to R4 as indicated by ellipses in FIG. 1.

In this embodiment, the dummy wirings are fabricated together with the TFT as in embodiment 1. Also, such a region that electrically connected wiring is transversal to the sealing material formation region 107, that is, the scanning line extension side region R3 and the signal line extension side region R4, and the wiring pattern 109 connected to the external terminal 108 are identical in structure with that of embodiment 1. Hereinafter, a process of fabricating the dummy wiring 401 for the first layer which is not electrically connected to the sealing material formation region 107 will be described with reference to FIGS. 7 and 8.

A starting film such as an aluminum film which forms the electrode/wiring for the first layer is formed in thickness of, for example, 3000 Å. As shown in FIG. 7, the starting film is patterned so that while the gate electrode/wiring of a TFT is formed, rectangular wave shaped dummy wirings 401 for the first layer are formed in a scanning line drive circuit side region R1 and a signal line drive circuit side region R2. In the scanning line drive circuit side region R1 and the signal line drive circuit side region R2, the pitches P1 and P2 of the dummy wirings 401 for the first layer are set to be equal to the pitch of the scanning lines 106 and the signal lines 105, and in this embodiment, it is set to about 50 $\mu$m, and the width of the dummy wirings 401 for the first layer is set to 10 $\mu$m. Also, the dummy wirings 401 for the first layer are designed so as not to project from the sealing material formation region 107.

The cross-sectional view taken along a line B-B' in FIG. 7 corresponds to FIG. 5. As shown in FIG. 5, in this embodiment, because the dummy wirings 401, the wirings 302 and 303 for the first layer are disposed at regular intervals in the sealing material formation region 107, the cross-sectional structure of the sealing material formation region 107 can be unified.

Under that state, the cross-sectional structure along the outer periphery of the sealing material formation region 107 can be made identical. However, in comparison with the respective intervals between the dummy wirings 401 for the first layer which are formed of the starting film of the wirings for the first layer being about 50 μm, their widths are small to about 10 μm. As a result, because their strength cannot be compensated, the dummy wirings 402 are formed on the interlayer insulator 220 so that the lower structure of the sealing material is reinforced.

After the interlayer insulator 220 is formed in thickness of about 4000 Å, a titanium film, a laminate film consisting of titanium and aluminum, or the like are formed in thickness of 4000 Å as a starting film of the electrodes/wirings for the second layer. The starting film is so patterned as to form the source/drain electrodes/wirings of a TFT, and also to form the linear dummy wirings 402 for the second layer at the regular intervals as shown in FIG. 8. The dummy wirings 402 for the second layer are formed in such a manner that they embed a region in which the dummy wirings 401 for the first layer are not formed and also that they are prevented from being superimposed on the dummy wirings 401 for the first layer. Thereafter, after the starting film (titanium/aluminum/titanium film) of the electrodes/wirings for the second layer has been patterned, a silicon nitride film 1000 to 3000 Å in thickness is formed as a passivation film 226. It should be noted that the cross-sectional view taken along the line B-B' in FIG. 8 corresponds to FIG. 6.

As shown in FIG. 8, in this embodiment, in the sealing material formation region 107, the dummy wirings 402 for the second layer are disposed on the interlayer insulation film 220 at regular intervals in a region where the dummy wirings 401 are not formed, thereby being capable of making identical the cross-sectional structure taken along the outer periphery of the sealing material formation region 107 shown in FIG. 6. Further, a passivation film 227 is formed on the surface of the dummy wirings 304 for the second layer, thereby being capable of flattening the surface of the sealing material formation region 107.

In particular, for the purpose of making the step of the lower structure in the sealing material formation region 107 uniform, it is important that the dummy wirings 402 for the second layer are prevented from being superimposed on the dummy wirings 401 for the first layer. If the intervals between the end surfaces are about 10 μm, the dummy wirings 401 are prevented from being superimposed on the dummy wirings 402 even though taking into consideration an error in alignment of the mask, or the like.

In this embodiment, because the dummy wirings 401 which are not disconnected are formed in the region to which the wirings are not transversal, particularly the regions R1 and R2 in the sealing material formation region 107, the dummy wirings 401 always exist in the cross-sectional structure which is transversal to the sealing material formation region 107 (cross-sectional structure along a line orthogonal to the line B-B'), thereby being capable of preventing moisture from entering from the exterior.

EMBODIMENT 3

Embodiment 3 is an modified example of the wiring pattern for the first layer in embodiment 1, in which only one layer of the wiring pattern is disposed in the sealing material formation region 107. In embodiment 1, because the dummy wirings 301 for the first layer and the dummy wirings 304 for the second layer are alternately arranged, patterning is facilitated. However, as shown in the cross-sectional view of FIG. 6, moisture is liable to enter from the interfaces between the dummy wirings 301 for the first layer, the dummy wirings 304 for the second layer, the interlayer insulation film 220 and the passivation film 227. In this embodiment, in order to prevent moisture from entering, the shape of the wirings for the first layer in the sealing material formation region 107 is devised.

Figure 9:
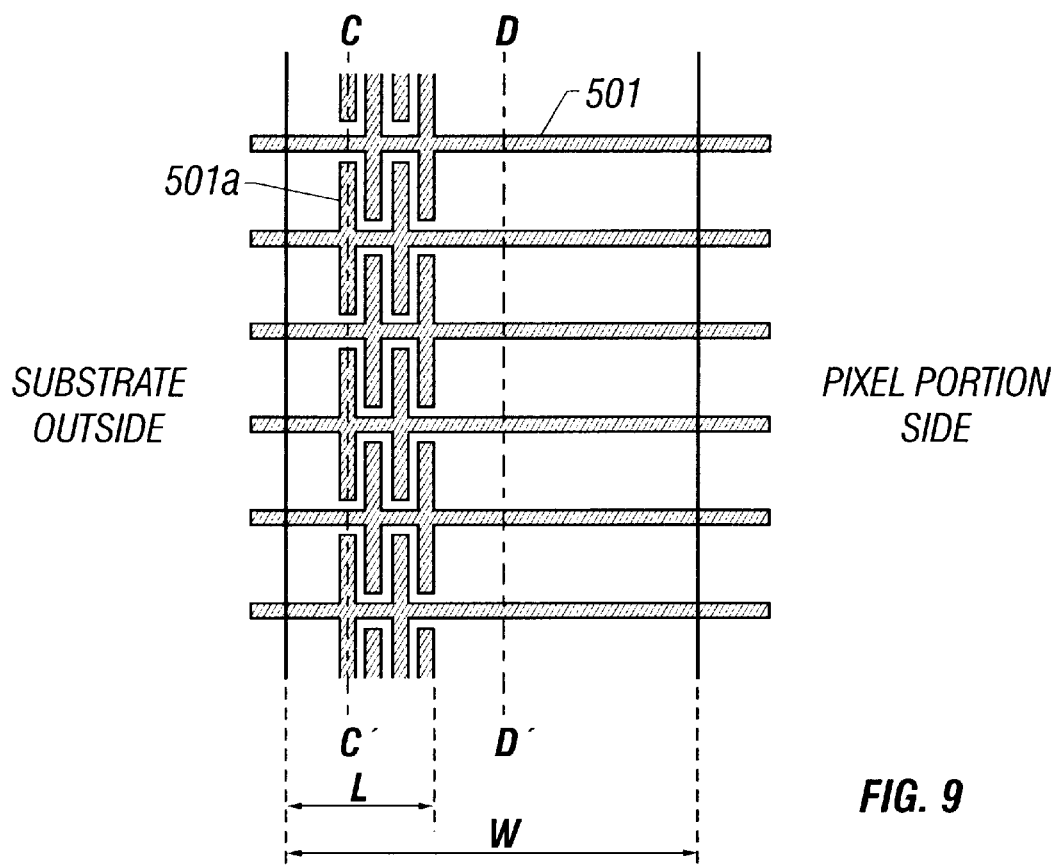
FIG. 9 is a diagram showing a process of fabricating the substrate interval correction means in accordance with embodiment 3.
Figure 10:
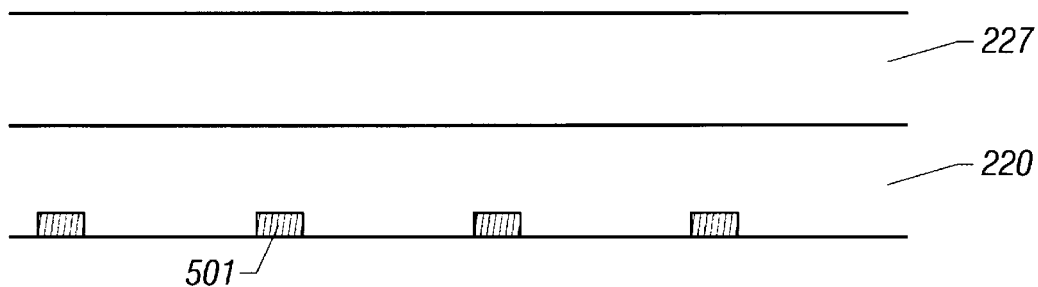
FIG. 10 is a cross-sectional view taken along a line C-C' in FIG. 9.
Figure 11:
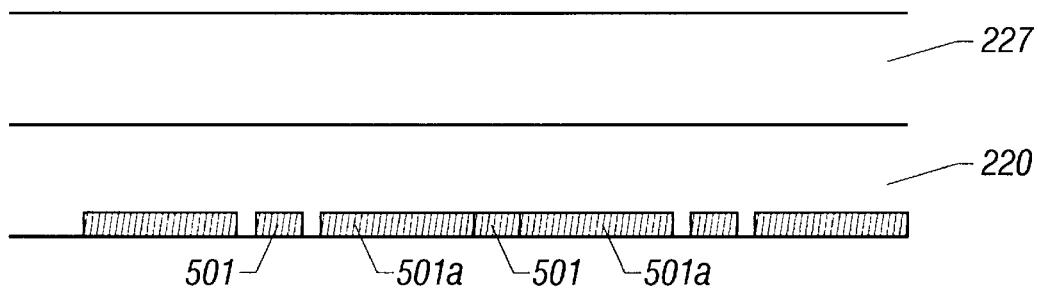
FIG. 11 is a cross-sectional view taken along a line D-D' in FIG. 9.

FIG. 9 is a top view of the sealing material formation region 107 in accordance with this embodiment, and show an enlarged diagram showing the vicinity of the scanning line drive circuit side region R1 and the signal line drive circuit side region R2. FIG. 10 is a cross-sectional view taken along a dotted line C-C' in FIG. 9, and FIG. 11 is a cross-sectional view taken along a dotted line D-D' in FIG. 9. Also, the dummy wirings of the lower portion in the sealing material in this embodiment are fabricated together with a TFT as in embodiment 1.

A starting film such as an aluminum film which forms the electrode/wiring for the first layer is formed in thickness of, for example, 3000 Å. The starting film is patterned so that while the gate electrode/wiring of a TFT are formed, dummy wirings 501 which are not electrically connected are formed as shown in FIG. 9. On the surface, as shown in FIGS. 10 and 11, an interlayer insulator 220 and a passivation film 227 are laminated one on the other sequentially in accordance with a process of fabricating the TFT. It should be noted that the wiring pattern made up of the starting film of the electrode/wiring for the second film may be formed on interlayer insulation film 220 so as not to be superimposed on the dummy wiring 501 as in embodiments 1 and 2.

Branches 501a orthogonal to the longitudinal direction of the dummy wirings 501 are formed at regular intervals at the outer edge side of the sealing material formation region 107 of the dummy wiring 501. Those branches 501a alternates with the branches 501a of the adjacent dummy wirings 501 so as to embed the gaps between the dummy wirings 501. Hence, because the dummy wirings 501 always exist in an arbitrary cross-sectional view which is transversal to the sealing material formation region 107 (the cross-sectional structure along a line orthogonal to the line C-C'), moisture can be prevented from entering from the exterior.

In order to prevent moisture from entering from the exterior, because the width W of the sealing material formation region 107 is about several mm, the length L of a region in which the branches 501a are formed may be set to about 100 to 500 μm. Also, the pitch of the dummy wirings 501 is made identical with the pitch of the pixels, and in a portion in which the branches 501a are formed, the minimum value of the intervals between the end surfaces of the adjacent dummy wirings 501 is preferably set to about 5 to 10 μm in order to prevent short-circuiting between the wirings.

It should be noted that in this embodiment, only the dummy wirings 501 formed in the scanning line drive circuit side region R1 and signal line drive circuit side region R2 was described. In the scanning line extension side region R3, the dummy wirings 501 are formed so as to be transversal to the sealing material formation region 107 and extend to the pixel side and the outside of the substrate, respectively. Also, in the signal line extension side region R4, the dummy wirings 501 are so designed as to extend the outside of the substrate so that the connection end portions may be formed on the pixel side as the wirings 303 shown in FIG. 3.

As a result, because the wiring patterns having the branches 501a are arranged uniformly on the outer edge portion side of the sealing material formation region 107, the lower structure of the sealing material disposed in the sealing material formation region 107 shown in FIG. 1 can be made symmetrical with respect to top and bottom as well as right and left on the paper surface. As a result, a pressure can be uniformly applied to the substrate when the substrates stick to each other.

It should be noted that in embodiments 1 to 3, the uppermost layer of the substrate interval correction means disposed in the sealing material formation region 107 is formed of the passivation film 227. Alternatively, the pixel electrodes 228, a black matrix and so on may be further formed on the surface of the passivation film 227 in accordance with the process of fabricating the pixel section 102.

EMBODIMENT 4

Figure 12:
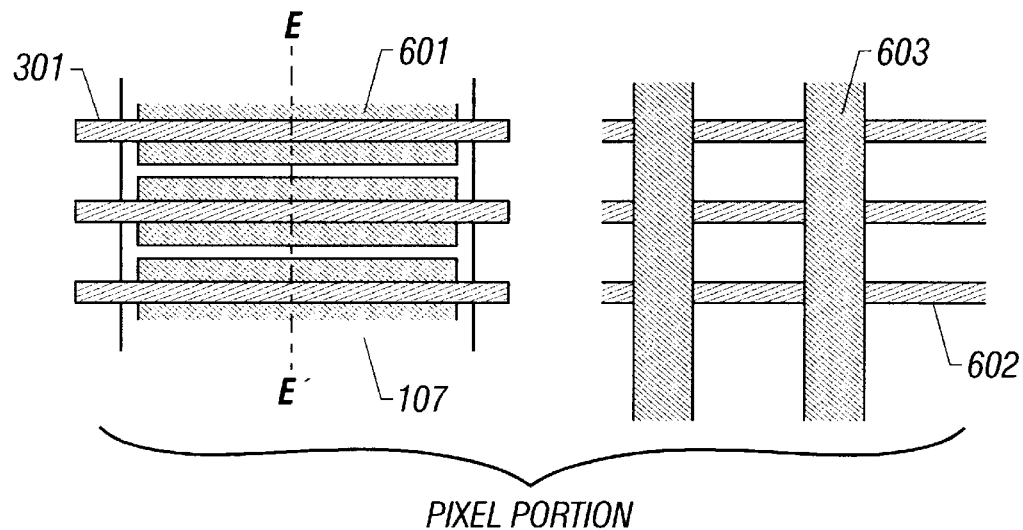
FIG. 12 is a top view showing a substrate interval correction means in accordance with embodiment 4.
Figure 13:
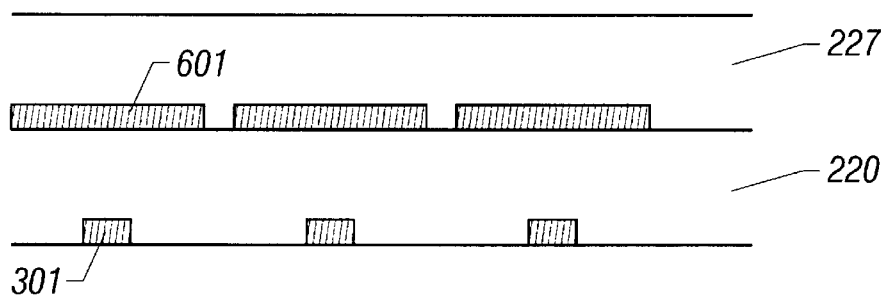
FIG. 13 is a cross-sectional view taken along the line E-E' in FIG. 12.

In embodiments 1 and 2, in order to make the lower structure of the sealing material uniform, the end surfaces of the wirings for the first layer are so designed as not to be superimposed on the end surfaces of the wirings for the second layer in the sealing material formation region. In embodiment 4, the end surfaces of the wirings for the first layer are superimposed on the end surfaces of the wirings for the second layer so that the step formed between the sealing material and the pixel section is made small. FIG. 12 is a top view of a substrate interval correction means in accordance with this embodiment, showing only a region of the scanning line drive circuit side or the signal line drive circuit side. Also, FIG. 13 is a cross-sectional view taken along a line E-E' in FIG. 12.

This embodiment is a modified example of the dummy wirings 304 for the second layer in embodiment 1 shown in FIGS. 4 and 6. In the sealing material formation region is first formed the linear dummy wirings for the first layer from the starting film of the scanning lines 602. Then, after the formation of the interlayer insulator 220, the starting film of the signal lines 603 is patterned so as to form the dummy wiring 601 for the second layer. The dummy wirings 601 are so formed at regular intervals as to be superimposed on the dummy wirings 301 for the first layer and also to embed a region in which no dummy wiring 301 is formed.

As a result, since the lower structure of the sealing material can be unified, a pressure can be uniformly applied to the sealing material when the substrates stick to each other. Further, convex portions having nearly the same step as that of a portion where the scanning lines 602 and the signal lines 603 are superimposed one on another are disposed at regular intervals in the sealing material formation region. Hence, since a pressure under which the substrates are stuck together is supported in the convex portion of the sealing formation region, the spacers can prevent the scanning lines 602 and the signal lines 603 from being short-circuited between the top and the bottom.

It should be noted that in this embodiment, the dummy wirings 601 for the second layer are set to be shorter than the width of the sealing material formation region 107, however, they may be set to be longer than the width of the sealing material formation region 107.

EMBODIMENT 5

Figure 14:
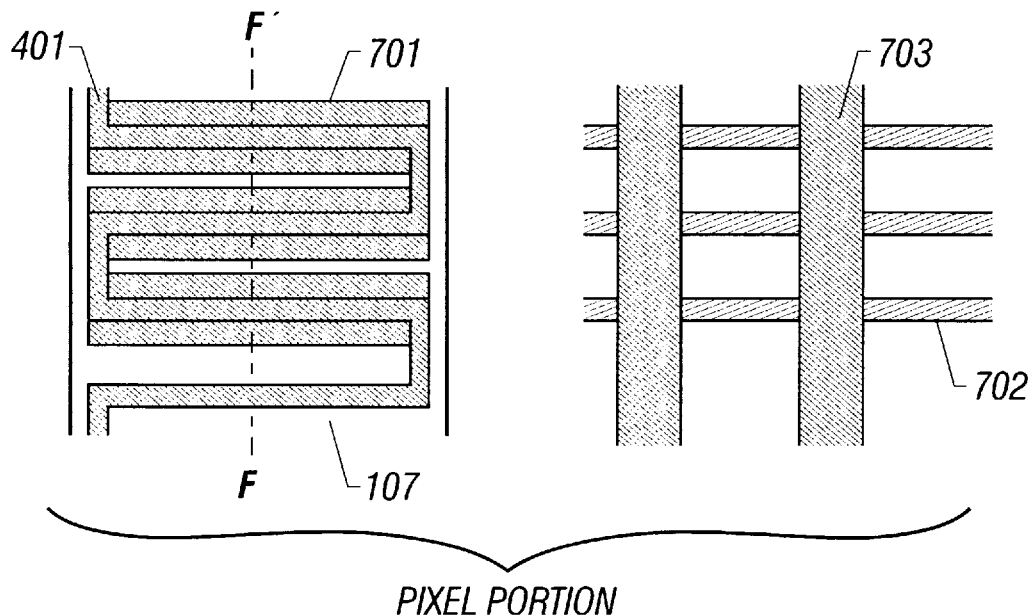
FIG. 14 is a top view showing a substrate interval correction means in accordance with embodiment 5.
Figure 15:
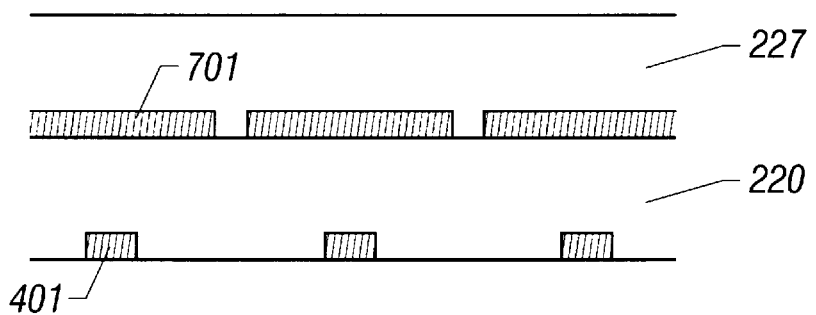
FIG. 15 is a cross-sectional view taken along the line F-F' in FIG. 14.
Figure 16:
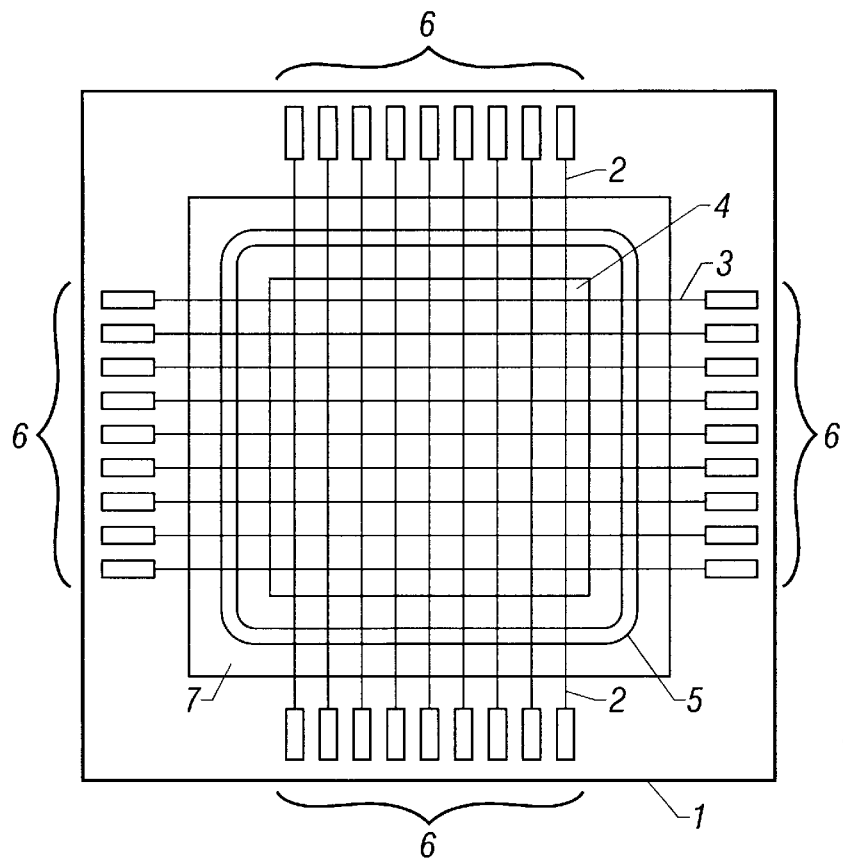
FIG. 16 is a top view showing a liquid-crystal display device in accordance with conventional example 1.
Figure 17:
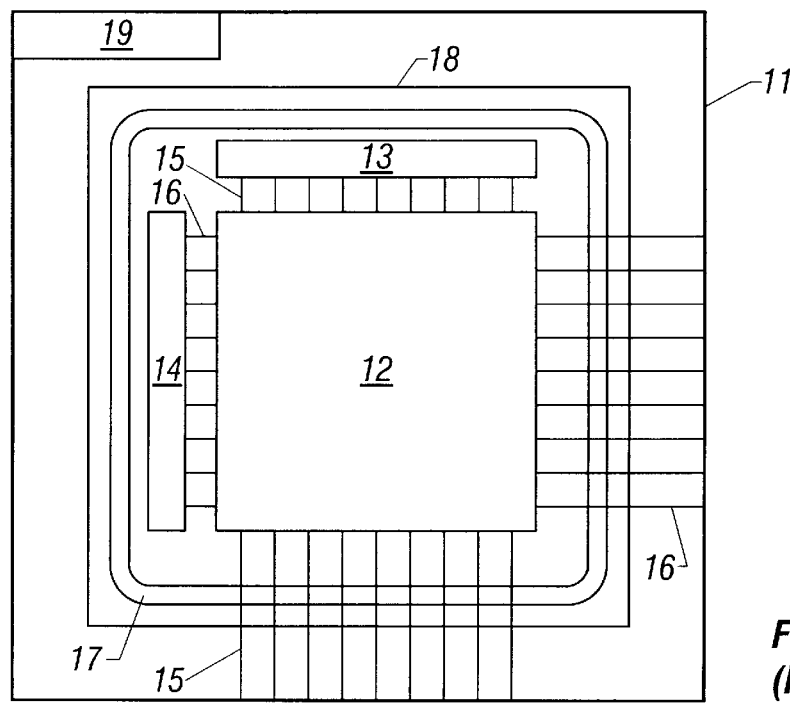
FIG. 17 is a top view showing a liquid-crystal display device in accordance with conventional example 2.
Figure 5:
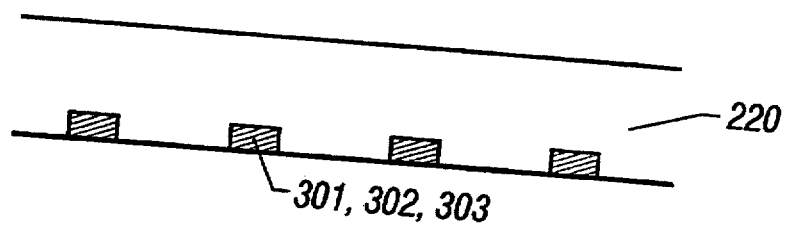
Figure 6:
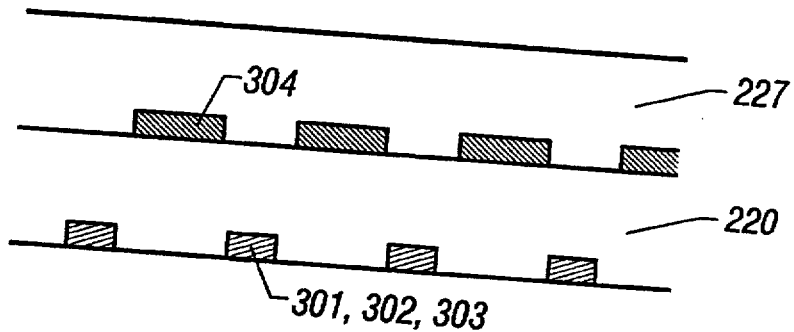
Figure 12:
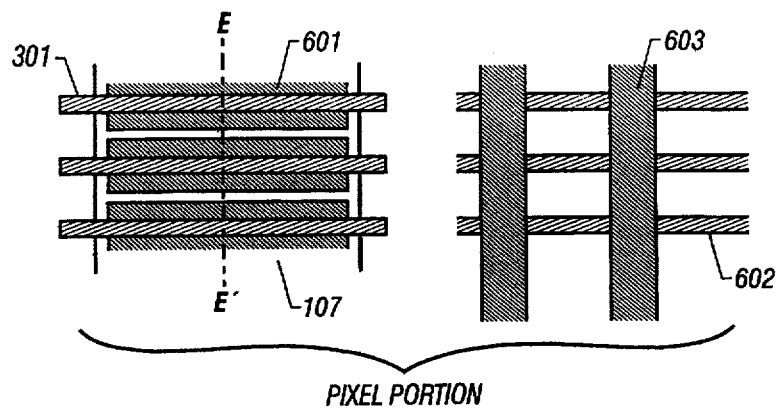
Figure 13:
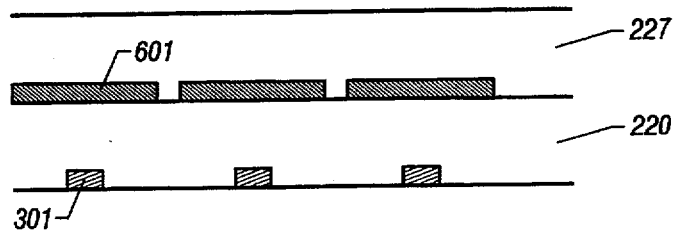
Figure 14:
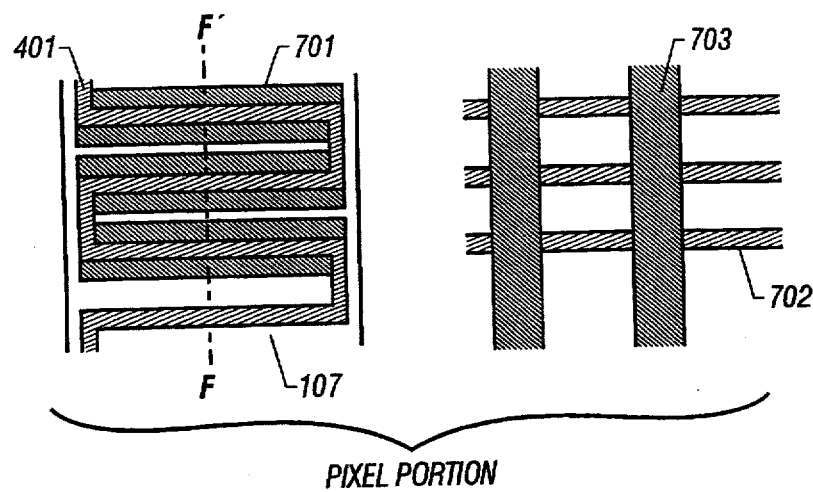
Figure 15:
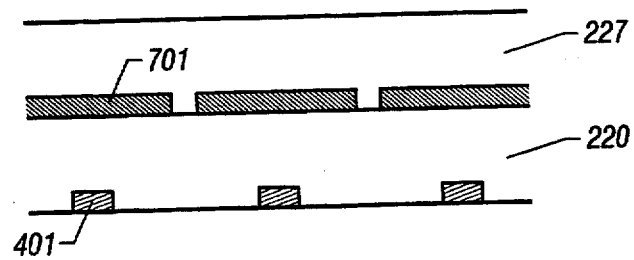

In embodiment 5, the end surfaces of the wirings for the first layer are superimposed on the end surfaces of the wirings for the second layer so that the step between the sealing material and the pixel section is made small. FIG. 14 is a top view of a substrate interval correction means in accordance with this embodiment, showing only the region of the scanning line drive circuit side or the signal line drive circuit side. Also, FIG. 15 is a cross-sectional view taken along a line F-F' in FIG. 14.

This embodiment is a modified example of the dummy wirings 401 for the second layer in embodiment 2 shown in FIG. 8. In the sealing material formation region, the linear dummy wirings for the first layer are first formed of the starting film of the scanning lines 702. Then, after the formation of the interlayer insulator 220, the starting film of the signal lines 703 is so patterned as to form the dummy wiring 701 for the second layer, and a passivation film 227 is formed on the surface. The dummy wirings 701 are so formed at regular intervals as to be superimposed on the dummy wirings 401 for the first layer and also to embed a region in which no dummy wirings 401 are formed. As a result, since the lower structure of the sealing material can be unified, a pressure can be uniformly applied to the sealing material when the substrates stick to each other. Further, convex portions having nearly the same step as that of a portion where the scanning lines 602 and the signal lines 603 are superimposed one on another are disposed at regular intervals in the sealing material formation region. Hence, since a pressure under which the substrates are stuck together is supported in the convex portion of the sealing formation region, the spacers can prevent the scanning lines 607 and the signal lines 703 from being short-circuited between the top and the bottom.

It should be noted that in embodiments 4 and 5, the uppermost layer of the substrate interval correction means disposed in the sealing material formation region 107 is formed of the passivation film 227. Alternatively, the pixel electrodes 228, a black matrix and so on may be further formed on the surface of the passivation film 227 in accordance with the process of fabricating the pixel section 102. As a result, the step of the substrate correction means can be made more equal to the step of the pixel section.

As was described above, in the liquid-crystal display device in accordance with the present invention, because the step corrected by the substrate interval correction means can be unified, the step of the sealing material per se can be similarly unified. Also, the substrate interval correction means prevents the matrix circuit from projecting from the sealing material even with the spacers. Hence, when the substrates stick to each other, the wirings can be prevented from being shirt-circuited with respect to the top and bottom in the peripheral drive circuit, thereby being capable of improving the yield of the peripheral drive circuit integral type liquid-crystal display device as well as the reliability. Further, since the substrate intervals can be uniformly maintained, the display nonuniformity disappears, thereby enabling high-accuracy display.

In addition, the substrate interval correction means in accordance with the present invention enables the matrix circuit and the peripheral drive circuit to be fabricated together without any increase in the number of processes.

What is claimed is:

1. A liquid-crystal display device comprising:
    an element substrate having:
        a matrix circuit;
        a peripheral drive circuit driving said matrix circuit;
    an opposite substrate being opposite to said element substrate;
    a sealing member for bonding said element substrate and said opposite substrate together;
    a substrate interval correction means being disposed in a sealing forming region where said sealing material is formed on the element substrate,
    wherein said substrate interval correction means includes at least a conductive layer that is not electrically connected to one of the matrix circuit or the peripheral drive circuit.

2. A device according to claim 1 wherein said substrate interval correction means includes a same material as said matrix circuit.

3. A device according to claim 1 wherein said matrix circuit includes a plurality of layers each being insulated by a plurality of insulating layers, and said substrate interval correction means includes a same laminate structure as said matrix circuit.

4. A device according to claim 1 wherein a maximum value of a thickness of said substrate interval correction means is substantially equal to a maximum thickness of said matrix circuit.

5. A device according to claim 1 wherein said peripheral circuit for driving said matrix circuit is disposed between said matrix circuit and said sealing material on said element substrate.

6. A liquid-crystal display device comprising:
an element substrate comprising a matrix circuit having:
a plurality of signal lines and a plurality of scanning lines which are disposed in a matrix and separated from each other through a first interlayer insulation film,
a plurality of pixel electrodes disposed on cross points of said signal lines and said scanning lines and separated from the signal lines through a second interlayer insulation film, and
a peripheral drive circuit for driving said matrix circuit;
an opposite substrate being opposite to said element substrate;
a sealing material which surrounds said matrix circuit and bonds said element substrate and said opposite substrate together;
a substrate interval correction means being formed in a sealing forming region where said sealing material is formed on said element substrate, said substrate interval correction means comprising:
a first conductive layer comprising a same material as the scanning lines,
said first interlayer insulation film,
a second conductive layer comprising a same material as the signal lines, and
said second interlayer insulation film,
wherein said first conductive layer, said first interlayer insulation film, said second conductive layer, and said second interlayer insulation film are formed in different layers from each other.

7. A device according to claim 6 wherein said peripheral drive circuit for driving said matrix circuit is disposed between said matrix circuit and said sealing material on said element substrate.

8. A device according to claim 6 wherein an end surface of said first conductive layer of the substrate interval correction means is not superimposed on an end surface of said second conductive layer.

9. A device according to claim 6 wherein said substrate interval correction means has at least a laminate structure which is identical with a region in which said signal lines are superimposed on said scanning lines in said matrix circuit.

10. A device according to claim 6 wherein a maximum value of a thickness of said substrate interval correction means is substantially equal to a maximum of a thickness of said matrix circuit.

11. A device according to claim 6 further comrising:
an external circuit being formed outside the sealing forming region or an external terminal being formed outside the element substrate;
a plurality of wiring elements for connecting said matrix circuit to said external circuit or said external terminal,
wherein each of the plurality of wiring elements is formed integrally with said first conductive layer, and
wherein said first conductive layer extends toward an outside of said sealing member.

12. A device according to claim 6 further comprising:
an external circuit being formed outside the sealing forming region or an external terminal being formed outside the element substrate;
a plurality of wirings for connecting said matrix circuit to said external circuit or said external terminal,
wherein each of the plurality of wirings is connected to said first conductive layer inside said sealing forming region, and
wherein said first conductive layer extends toward an outside of said sealing forming region.

13. A device according to claim 6 further comprising,
an external circuit being formed outside the sealing forming region or an external terminal being formed outside the element substrate,
wherein said second conductive layer is not electrically connected to any one of said matrix circuit, said external circuit and said external terminal.

14. A device according to claim 6,
wherein said first conductive layer comprises a first plurality of linear wirings being disposed at first regular intervals, and
wherein said second conductive layer comprises a second plurality of linear wirings in parallel with the signal lines or the scanning lines being disposed at second regular intervals, each of the second plurality of linear wirings being formed in a gap between the first plurality of linear wirings.

15. A device according to claim 6 wherein said first conductive layer has a zigzags shape with substantially equal width of said sealing material.

16. A device according to claim 6 wherein said first conductive layer is substantially equal to a pitch of said pixel electrode.

17. A device according to claim 6,
wherein said matrix circuit further includes a plurality of thin-film transistors for driving said pixel electrodes,
wherein said first conductive layer is formed together with said scanning lines, and said second conductive layer is formed together with said signal lines.

18. A liquid-crystal display device comprising:
an element substrate comprising a matrix circuit having:
a plurality of signal lines and a plurality of scanning lines which are disposed in a matrix and separated from each other through a first interlayer insulation film,
a plurality of pixel electrodes disposed on cross points of said signal lines and said scanning lines and separated from the signal lines through a second interlayer insulation film,
a plurality of thin-film transistors each for operating each of the pixel electrodes, and
a peripheral drive circuit for driving said matrix circuit;
an opposite substrate being opposite to said element substrate;
a sealing material which surrounds said matrix circuit and bonds said element substrate and said opposite substrate together;
a substrate interval correction means being formed in a sealing forming region where said sealing material is formed on said element substrate, said substrate interval correction means having:
at least a conductive layer comprising a same material as the scanning lines, said first interlayer insulation film, and
said second interlayer insulation film, wherein said conductive layer, said first interlayer insulation film, and said second insulation film are formed in different layers from each other, wherein said conductive layer is not electrically connected to any one of the matrix circuit and the peripheral drive circuit.

19. A device according to claim 18 wherein said peripheral drive circuit for driving said matrix circuit is disposed between said matrix circuit and said sealing material on said element substrate.

20. A device according to claim 18 further comprising:
an external circuit being formed outside the sealing forming region or an external terminal being formed outside the element substrate;
a plurality of wirings for connecting said matrix circuit to said external circuit or said external terminal,
wherein each of the plurality of wirings is formed integrally with said conductive layer, and
wherein said conductive layer extends toward an outside of said sealing member.

21. A device according to claim 18 further comprising:
an external circuit being formed outside the sealing forming region or an external terminal being formed outside the element substrate;
a plurality of wirings for connecting said matrix circuit to said external circuit or said external terminal,
wherein each of the plurality of wirings is connected to said conductive layer inside said sealing forming region, and
wherein said conductive layer extends toward an outside of said sealing forming region.

22. A device according to claim 18 wherein said conductive layer is disposed along an edge portion of said element substrate and has a plurality of branches.

23. A device according to claim 22 wherein the branches of said conductive layer are formed in an outer portion of said sealing forming region.

* * * * *

UNITED STATES PATENT AND TRADEMARK OFFICE
CERTIFICATE OF CORRECTION

PATENT NO. : 5,995,189  
DATED : November 30, 1999  
INVENTOR(S) : Hongyong Zhang It is certified that error appears in the above-identified patent and that said Letters Patent is hereby corrected as shown below:

Drawings,  
Please substitute the attached FIG. 6, FIG. 13, FIG. 14, and FIG. 15.  
Sheet 5 of 12, please delete FIG. 6 in its entirety, and substitute therefor the attached Fig. 6  
Sheet 10 of 12, please delete FIG. 13 in its entirety, and substitute therefor the attached Fig. 13  
Sheet 11 of 12, please delete FIG. 14 and 15 in its entirety, and substitute therefor the attached Fig. 14 and 15.

Signed and Sealed this

Twenty-ninth Day of January, 2002

Attest:

Attesting Officer

JAMES E. ROGAN  
Director of the United States Patent and Trademark Office

PIXEL PORTION